United States Patent [19]

Kostanecki et al.

[11] Patent Number: 5,000,353

[45] Date of Patent: Mar. 19, 1991

[54] DOSING AND DISPENSING DEVICE

[75] Inventors: Andrew T. Kostanecki, New Canaan; Robert Brainard, Danbury; Lester Miller, Danbury; Robert LaPointe, Danbury, all of Conn.

[73] Assignee: Colgate-Palmolive Company, Piscataway, N.J.

[21] Appl. No.: 449,614

[22] Filed: Dec. 12, 1989

[51] Int. Cl.$^5$ ............................................. B65D 37/00
[52] U.S. Cl. ................................... 222/207; 222/282; 222/210; 222/453; 222/456
[58] Field of Search ......................... 222/181, 206–207, 222/209–210, 212–213, 215, 425, 441, 446–447, 450–451, 453–454, 456, 476–477

[56] References Cited

U.S. PATENT DOCUMENTS

| | | | |
|---|---|---|---|
| 298,778 | 5/1884 | Rogers, Jr. | 222/456 X |
| 2,233,818 | 3/1941 | Matter | 222/207 X |
| 2,939,615 | 6/1960 | Lerner | 222/207 |
| 3,141,580 | 7/1964 | Rogers | 222/453 X |
| 3,229,866 | 1/1966 | Arbitman et al. | 222/485 X |
| 3,255,933 | 6/1966 | Martin | 222/212 X |
| 3,841,524 | 10/1974 | Easter | 222/453 X |
| 4,257,538 | 3/1981 | Fowler | 222/453 X |
| 4,582,230 | 4/1986 | Vierkotter | 222/442 |
| 4,773,569 | 9/1988 | Larsson | 222/181 |
| 4,811,871 | 3/1989 | Wass et al. | 222/477 |

Primary Examiner—Michael S. Huppert
Attorney, Agent, or Firm—Michael J. McGreal; Robert C. Sullivan; Murray M. Grill

[57] ABSTRACT

This container is a unique self-dosing and dispensing container. Through the use of a one-piece, self-aligning valve which moves from one position of closing a dispensing opening to a position of opening the dispensing opening and simultaneously closing the opening between the container and the chamber which contains the dispensing opening. The valve is operated by a change in pressure within the container. The change in pressure in the container is induced by flowing an excess of fluide from the container so as to cause a negative pressure. There are various techniques for creating a negative pressure in the container, including the use of a bellows built into the container and a squeezing of the sidewalls of the container.

20 Claims, 5 Drawing Sheets

DOSING AND DISPENSING DEVICE

BACKGROUND OF THE INVENTION

This invention relates to a device for measuring a dose of a substance and for dispensing this measured dose from a container. More particularly, this invention relates to a device for measuring and delivering a dose of a liquid from a bottle.

For various liquids it is necessary to measure out a particular amount for use. This can be done through the use of a separate measuring cup or other apparatus. However, this has many disadvantages. One disadvantage is that a separate measuring device must be maintained. Another, is that a certain amount of the liquid that is being used will be left in the measuring device leading to some wastage. Further, the use of a separate measuring apparatus is not convenient. For these and other reasons, more and more containers are being supplied for usage with dose measuring devices as in integral part of the container. This provides for greater convenience as well as for fairly accurate measurement of the dose of a liquid that is to be used. These various dose measuring and dispensing devices are generally fairly complex and rather costly. In many instances, there is required a number of intricately shaped parts which must then be interfitted. In other devices, there is required that various parts have fairly close tolerances. In general, these devices are more complex and more costly than is necessary.

The present invention is directed to solving the problem of providing a low cost dose measuring and dispensing device which is also of a non complex construction. The dose measuring and dispensing device can easily be produced in large quantities and made a part of various size containers. Since it can be used with a wide range of container sizes, this dosing and measuring device can be used to dispense a wide range of liquid products. For instance, it can be used to dispense liquid soaps, detergents, fabric softeners, window cleaning compositions, and various other hard surface cleaning compositions.

There are various types of dosing and dispensing devices disclosed in the prior art. In U.S. Pat. No. 298,778 there is disclosed a combined liquid measuring and registering device for bottles. This device consists of two separate or interconnected ball valves in a chamber in the bottom area of a bottle. In this construction, the measuring chamber is filled by the hydrostatic pressure of the liquid in the bottle. After the measuring chamber has been filled, the bottle is inverted to deliver the measured dose. Through the action of the ball valves, the inlet to the measuring chamber and the outlet from the measuring chamber are alternately opened and closed.

In U.S. Pat No. 645,706 there is disclosed a bottle which has in the neck area a ball valve mechanism for measuring and delivering a dose of a liquid. In this device when the bottle is partially tilted, a dose of the liquid can be delivered to the measuring chamber. Then when the bottle is further tilted, the opening between the bottle and measuring chamber is closed and the opening between the measuring chamber and the exterior opened. In this way, the measured dose is dispensed from the bottle.

U.S. Pat. No. 3,141,580 discloses a measuring pump dispenser which has valve means for opening and closing two different openings. One of the openings is from the container to the measuring chamber and the other opening is from the measuring chamber to the exterior. This dispenser mechanism is actuated by means of squeezing the measuring chamber area to thereby move the valve mechanism.

In U.S. Pat. No. 3,229,866 there is disclosed a squeeze bottle dispenser. In this squeeze bottle dispenser the bottle is squeezed all in the upright condition in order to provide liquid into an upper measuring chamber. At this point, the squeezing of pressure on the bottle is released whereby the valve that had been closing off the dispensing aperture is drawn downwardly to now close the aperture between the bottle and the measuring chamber. The bottle is then tilted and the dose of liquid is dispensed.

In U.S. Pat. No. 4,257,538 there is disclosed a liquid dispenser that can be used to discharge a dose of a liquid such as a mouthwash into a receptacle such as a paper cup. In this device a valve member is carried by a support which is actuated by means of the receptacle cup. When the dispensing device is not delivering a measured dose of a liquid, the valve member is in a downward position being biased by two springs. In this way, the dispensing opening is maintained in a closed position. However, when a cup is placed against the valve support and pushed upwardly, the valve moves to open the exit dispensing opening and closing the opening between the container which contains additional liquid and the measuring chamber.

In U.S. Pat. No. 4,582,230 there is disclosed a metering device which consists of a piston valve on one end and a ball valve on the other end. There is disclosed in this patent a fairly intricate dose measuring and delivering mechanism. In this mechanism as a bottle is tilted, a given dose of liquid will flow from the container into the measuring chamber. As the bottle is further tilted, the opening between the container and the measuring chamber is closed and the opening between the measuring chamber and the exterior is opened. In this way, a given dose of a liquid is measured and then dispensed.

In U.S. Pat. No. 4,773,569 there is disclosed a dose measuring and dispensing mechanism which consists of two interconnected ball valves. This mechanism is particularly directed for dispensing viscous liquids and pastes. In use, the container is inverted so that a quantity of the substance to be delivered flows from the container and into the measuring chamber. At this point, when the measuring chamber has been filled, the walls of the measuring chamber are pushed inwardly whereby a valve closes the opening between the container and the measuring chamber and opens the dispensing aperture so that the contents of the measuring chamber can be dispensed.

There are various techniques and structures of devices that have been used in the prior art for the delivery of a measured dose of a liquid or other substance. They operate on various different principles. They are likewise of varying complexity. However, they are generally of a high cost. In this regard, the dosing and dispensing device of the present invention resolves many of these disadvantages. As has been pointed out, the dosing and dispensing device of the present invention is noncomplex in its structure and yet accurately dispenses a given dose of a liquid.

BRIEF SUMMARY OF THE INVENTION

The self dosing and dispensing device of the present invention operates on the principle of creating a negative pressure within the liquid container and to utilize this negative pressure in order to actuate a self-aligning valve to close off an aperture between the container and the measuring chamber and to simultaneously open the dispensing opening. In this regard, the actuation of the self-aligning valve is not caused by gravity or a spring biasing mechanism. Rather, it is actuated slowly by the development of a negative pressure in the container as the measuring chamber is being filled. This negative pressure in the container is generated through various techniques.

In one embodiment there is used a grooved self-aligning valve. In the use of this valve, the bottle is tilted to fill the measuring chamber. Upon the bottle being tilted and the measuring chamber filled some of the liquid will be dispensed through the groove of the self-aligning valve. This dispensed liquid will create a negative pressure in the container which in turn then draws the self-aligning valve upwardly into the aperture between the container and the measuring chamber. When this occurs, the dispensing opening is opened and the liquid in the measuring chamber is dispensed.

In a second embodiment a negative pressure can be created in the container through the use of a measuring chamber construction which utilizes a bellows in the side wall. In this instance, when the bottle is titled, the self-aligning valve will fall downwardly into the dispensing opening to thereby close this aperture. The opening between the container and the measuring chamber is then opened and liquid flows into the measuring chamber. The weight of the liquid which flows into the measuring chamber will cause the bellows to expand thereby permitting more liquid to enter the measuring chamber and to create a negative pressure in the container. This negative pressure in the container will then draw the self-aligning valve upwardly into the aperture between the container and the measuring chamber to seal this aperture and to open the dispensing aperture. In this way, a measured dose of the liquid can be delivered as needed.

In a further embodiment there can be used a container which has flexible side walls and which can be squeezed. In this instance, the flexible sidewall of the container is squeezed while the container is in an upright position. This can be done while the container is being grasped and lifted. This decreases the volume of the container. The container is then tilted whereby the self-aligning valve moves downwardly to seal the dispensing aperture and to thereby open the aperture between the container and the measuring chamber. When the measuring chamber has been filled, the pressure on the flexible sidewalls of the container is released whereby a negative pressure is produced in the container. This negative pressure draws the self aligning valve upwardly into the aperture between the container and the measuring chamber thereby opening the dispensing opening.

In an additional embodiment the bottle can contain a bellows type trigger handle. The operation of this dosing and dispensing container is similar to that wherein the container has flexible sidewalls that are squeezed. In this embodiment the flexible trigger is squeezed to thereby reduce the volume of the container. The container is then tilted so that the self aligning valve falls downwardly and closes the dispensing aperture. At the same time, the aperture between the container and the measuring chamber is opened and the measuring chamber permitted to fill with liquid. When filled with liquid, the trigger on the handle is released thereby creating a negative pressure in the container which draws the self-aligning valve upwardly to close and seal off the aperture between the container and the measuring chamber and to thereby open the dispensing aperture. In this way, a measured dose of liquid is dispensed.

These various techniques for delivering a dose of a liquid depend on the generation of a negative pressure in the container. It is this negative pressure that will draw the self-aligning valve upwardly against the force of gravity so a dose can be measured and this dose dispensed.

Further, these techniques depend on the use of a self-aligning valve. The use of a self-aligning valve permits for the flexibility in the operation of the dose measuring and dispensing device. In particular, this valve, since it does not ride in a valve guide, is not subject to false openings or closings. That is, the valve cannot become jammed in any one position whereby one or both of the apertures of the measuring chamber are opened or closed. In addition, this valve assembly has a low cost.

DETAILED DESCRIPTION OF THE INVENTION

As has been noted, the present dosing and dispensing device is comprised of a low cost and noncomplex structure. There is used a self aligning valve in order to sequentially open and close apertures between the container and measuring chamber and between the measuring chamber and the exterior. The use of a self-aligning valve provides for a positive opening and closing of each aperture. Further, it decreases the complexity of the structure of the device. In this present dose measuring and dispensing device when the container is tilted, a self-aligning valve will move downwardly under the force of gravity and substantially seal the aperture between the measuring chamber and the exterior. In this way, the opening between the container and the measuring chamber is opened and liquid flows into the measuring chamber. When a pre-determined dose is in the measuring chamber, an event occurs to create a negative pressure in the container whereby the self-aligning valve moves upwardly from sealing the aperture between the measuring chamber and the exterior to sealing the aperture between the container and the measuring chamber. The event which creates the negative pressure is dependent on the particular embodiment of the present invention. The various embodiments by which this negative pressure can be created in the container will now be described in detail with reference to the drawings.

Figure 1:
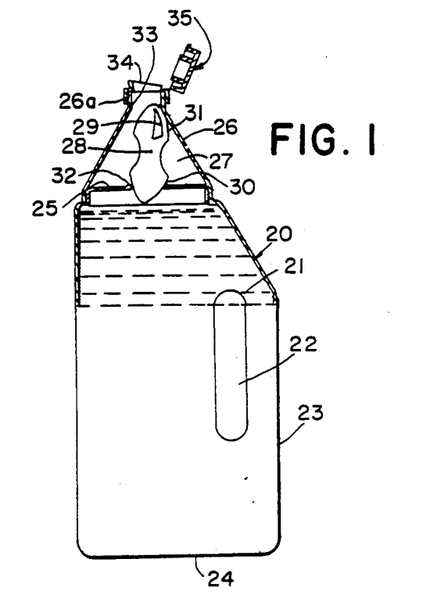
FIG. 1 is an elevational view in section of the self dosing and dispensing device which has a grooved valve.

FIG. 1 shows one embodiment of the present self dosing and dispensing device. Since this self dosing and dispensing device is to be utilized with liquids it is depicted in conjunction with a bottle. In this figure bottle 20 contains liquid 21. The bottle is shown here with a handle opening 22. Sidewall 23 also comprises part of the handle structure. The bottom wall of the bottle is 24. The upper part of the bottle consists of top surface 25 which has aperture 32 therein. Aperture 32 is shown with self-aligning valve 28 sealably located within aperture 32. The sidewalls 30 of the self-aligning valve 28 makes a liquid tight seal with the sidewalls of aperture 32. This self-aligning valve 28 is situated within measuring chamber 27 which is comprised of sidewall 26 and neck 26a. The neck forms the dispensing aperture 34 and is the support for cap closure 35. Cap closure 35 is shown as a hinged cap which is attached to the neck 26a by means of a snap arrangement. However, the cap and closure may be fastened to the neck area by means of threads, adhesive bonding or the like. In a like manner, the sidewall 26 of measuring chamber 27 can be fastened to the upper part of the container 20 by a threaded arrangement, adhesive bonding, a snap fit or the like. In the inner part of the neck 26a is shoulder 33 which provides a surface which can be contacted by the valve 28 when it is in a position to close aperture 34. In such an instance surface 31 of valve 28 will contact shoulder 33 in the neck. In this embodiment there is shown on the upper part of self-aligning valve 28 a groove 29. This groove 29 is purposely a part of self-aligning valve 28 in order to permit some of the contained liquid to exit the measuring chamber. It is the result of such liquid exiting the measuring chamber that a negative pressure is induced within the container 20. It is this negative pressure that will actuate the self-aligning valve 28 to move upwardly against gravity to close the container-measuring chamber aperture 32.

Figure 2:
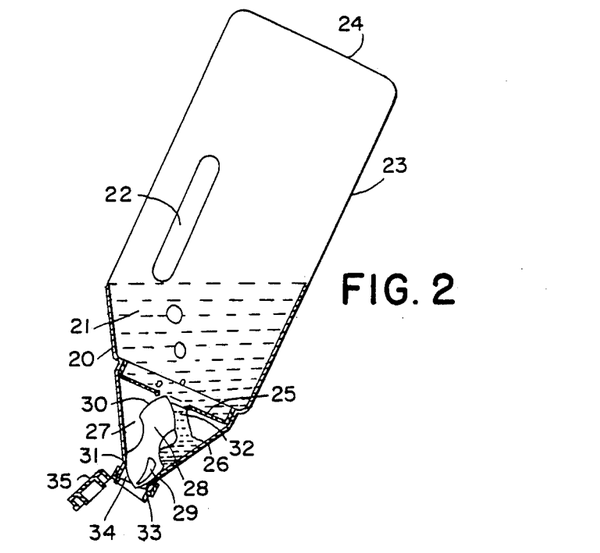
FIGS. 2, 3, and 4 illustrate the operation of the dosing and dispensing device of FIG. 1.
Figure 3:
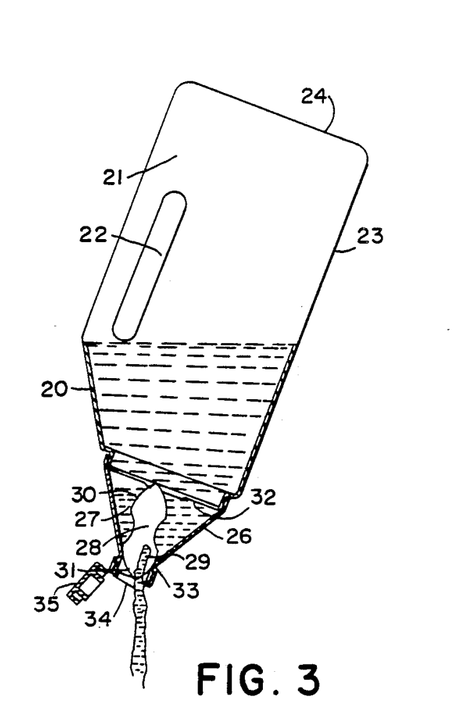
Figure 4:
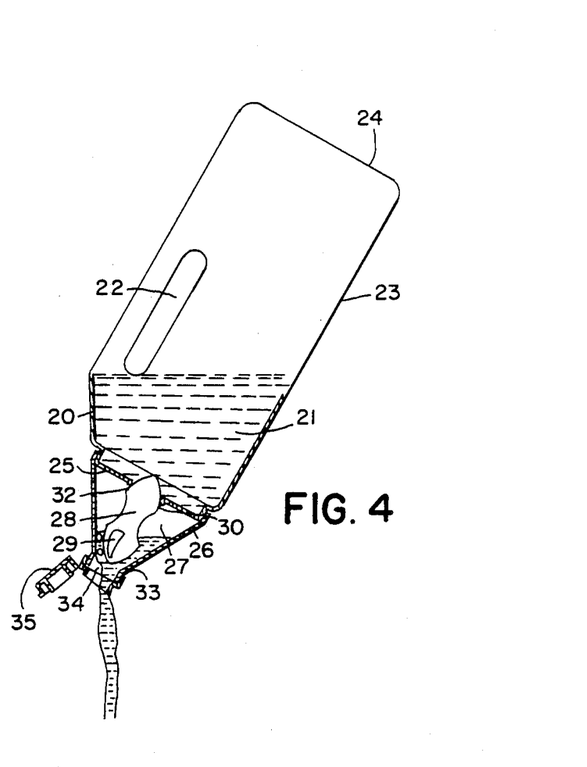

The operation of this dosing and dispensing device is described in FIGS. 2, 3, and 4. In FIG. 2, the container 20 has been tilted. Upon being tilted the self aligning valve 28 drops down into dispensing aperture 34 whereby the shoulder 31 of valve 28 contacts the surface 33 of the neck to form a seal. At the same time, the aperture 32 between the container and the measuring chamber has been opened so that liquid 21 can flow from the container into the measuring chamber 27. In FIG. 3 the measuring chamber 27 is shown to be substantially full of the liquid 21. At this time, some of the liquid is exiting through the groove 29 of self-aligning valve 28. It is this exiting liquid which produces a decreased pressure within container 20. As is shown in FIG. 4 it is this induced negative pressure that then moves self-aligning valve 28 upwardly into aperture 32 thus closing off aperture 32. At the same time, the measured dose of liquid in measuring chamber 27 is allowed to flow from the measuring chamber through aperture 34. The container can then be brought to an upright position. In order to start another cycle, the container is again tilted to close the dispensing aperture and open the aperture between the container and measuring chamber. This then fills the measuring chamber. After the measuring chamber is filled, it will again discharge its contents.

Figure 5:
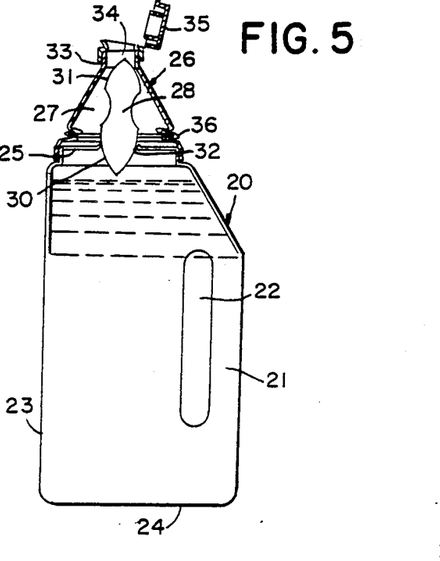
FIG. 5 is an elevational view in section of a dosing and dispensing device wherein the sidewall of the measuring chamber is at least partially constructed of a bellows construction.

In FIG. 5, there is shown the embodiment of the present dosing and dispensing device wherein the negative pressure in the container 20 is produced by means of a bellows 36 built into the sidewall 26 of the measuring chamber 27. Also in this embodiment there is no groove 29 in the upper part of the self aligning valve 28. In all other aspects, this dosing and dispensing device is essentially the same as that of FIG. 1.

Figure 6:
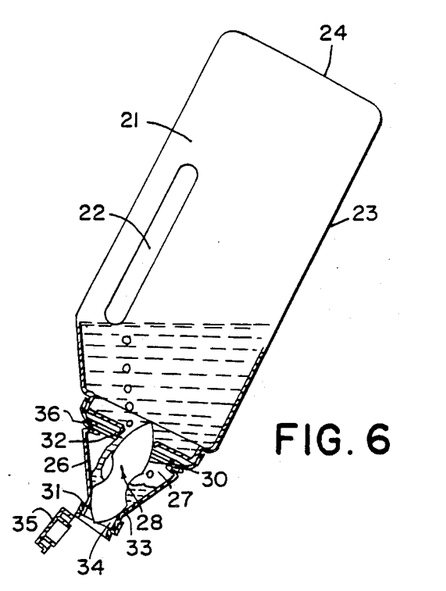
FIGS. 6, 7, and 8 illustrate the operation of the dosing and dispensing device of FIG. 5.
Figure 7:
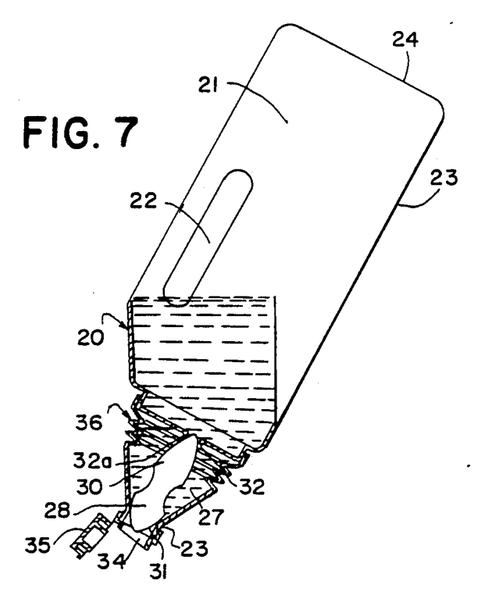
Figure 8:
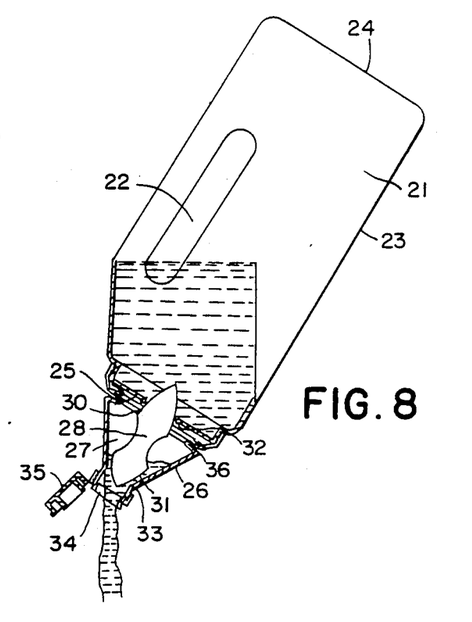

FIGS. 6, 7, and 8 show the operation of the self dosing container of FIG. 5. In FIG. 6, there is shown the container of FIG. 5 in a position where it has been tilted whereby the self-aligning valve 28 has moved by gravity down into dispensing aperture 34. The wall 31 of the self-aligning valve 28 contacts area 33 to provide a seal. When this occurs, liquid is permitted to pass through container-measuring chamber aperture 32 and flow into measuring chamber 27. As is shown in FIG. 7, as the liquid 21 flows into measuring chamber 27 the weight of this liquid causes the bellows portion 36 of sidewall 26 to open and thus to increase the volume of the measuring chamber. This, in turn, induces a reduced pressure within the container 20, which as shown in FIG. 8, causes the self aligning valve 28 to move upwardly against the force of gravity and to seal the container-measuring chamber aperture 32. At the same time, dispensing aperture 34 is open permitting the liquid contained within the measuring chamber 27 to flow out through the dispensing aperture. When the measured dose has been dispensed, the container is returned to the upright position. If it is desired to measure out a second dose, the container is again inverted to have the self-aligning valve close aperture 34 and to repeat the sequence of filling the measuring chamber and then discharging the contents of the measuring chamber. In the alternative, if it is not desired to dispense a second dose, the cap closure 35 ca be closed and the container thus sealed.

Figure 9:
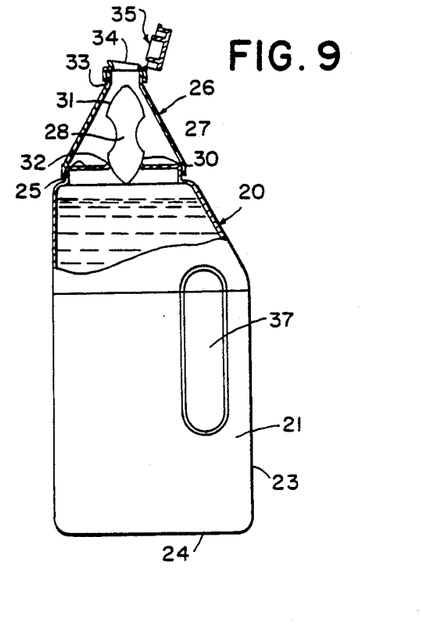
FIG. 9 is a side elevational view in section of a dosing and dispensing device wherein the container has a flexible sidewall so that it can be squeezed to decrease the volume of the container.
Figure 10:
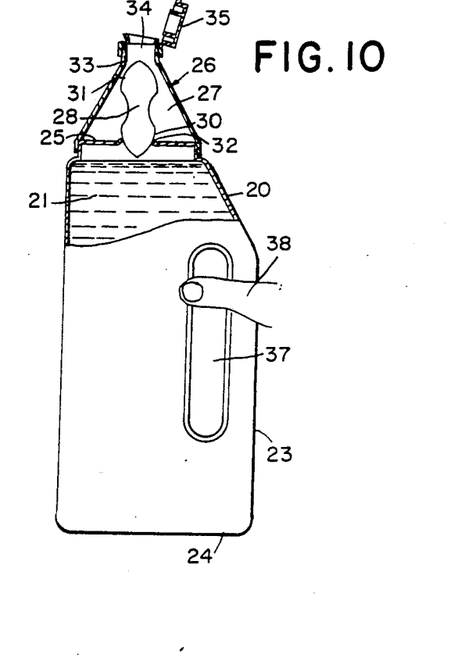
FIGS. 10, 11, 12, and 13 illustrate the use of the container of FIG. 9.
Figure 11:
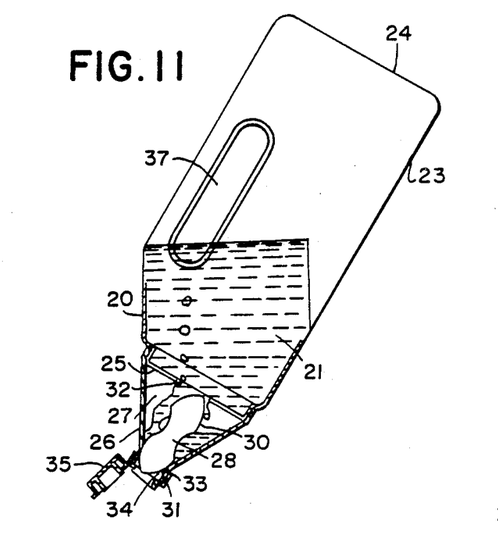
Figure 12:
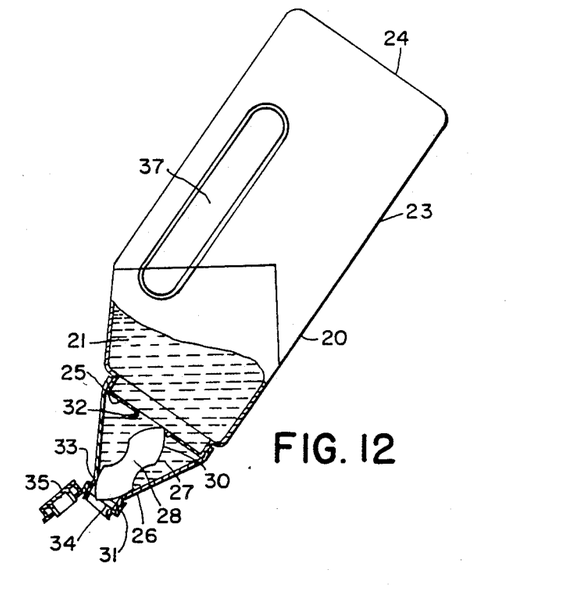
Figure 13:
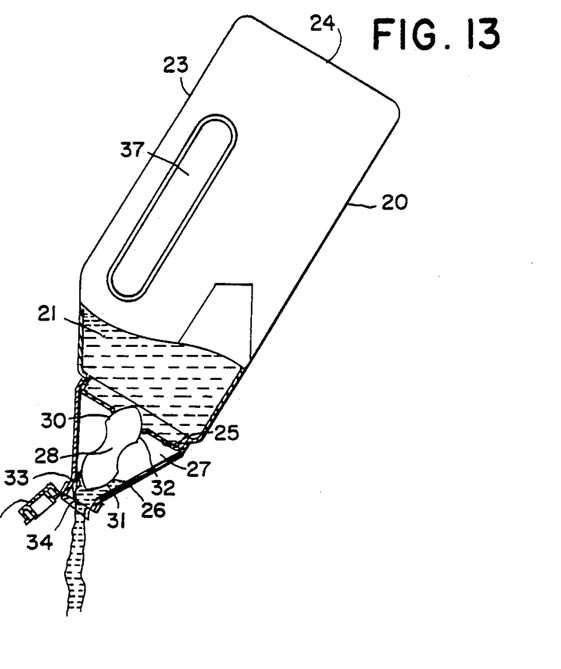

In FIG. 9, there is shown a further embodiment of the present dosing and dispensing device. In this embodiment either the full sidewall 23 of container 20 or a portion, of the sidewall of this container can be of a flexible nature whereby the container 20 can be squeezed. When container 20 is squeezed, the volume of the container is decreased. It is this decrease in volume that will eventually cause the reduced pressure in the container and thus actuate the dispensing of the liquid in the measuring chamber. The operation of this dosing and dispensing device of FIG. 9 is shown in FIGS. 10-13. In FIG. 10, it is shown that a flexible portion 37 of the sidewall 23 of container 20 is squeezed to thereby decrease the volume of container 20. This causes the volume of the container 20 to decrease. At this time, the container-measuring chamber aperture 32 is in a closed position by means self-aligning valve 28. In the next step as is shown in FIG. 11 the container is tilted whereby the self-aligning valve 28 falls downwardly under the force of gravity and seals the dispensing aperture 34. As this occurs, the container-measuring chamber aperture 32 is opened permitted the liquid 21 to flow into measuring chamber 27. During this time, the squeezing pressure is maintained on area 37 of the container. In FIG. 12, the measuring chamber 27 is shown in an essentially full condition. Up to this time, a squeezing pressure is maintained on region 37 of the container. However, at this point the squeezing pressure is released with the results as shown in FIG. 13 that self-aligning valve 28 moves upwardly into the container-measuring chamber aperture 32 thus sealing off this opening. At the same time, the dispensing aperture 34 is opened and the measured dose of liquid is permitted to flow through dispensing aperture 34. At the conclusion of the liquid being dispensed from measuring chamber 27, the container can be returned to an upright condition and sealed using cap 35 or part of the operation of FIGS. 10-13 repeated in order to dispense a second dose of the liquid. In order to deliver a second dose, it is only necessary to squeeze the container to move the self-aligning valve downwardly to seal the dispensing aperture and to permit the measuring chamber to be filled. Upon release of pressure on the sidewalls, a negative pressure is again created in the container causing the self-aligning valve to close the aperture between the container and measuring chamber. Simultaneously, a dose is dispensed. If it is not desired to dispense any additional doses, the cap closure is closed.

Figure 14:
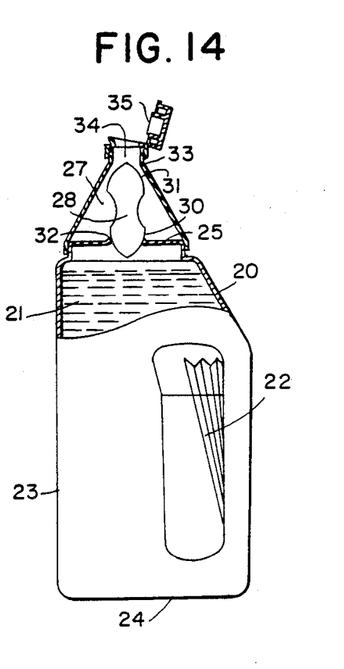
FIG. 14 is a side elevational view in section of a dosing and dispensing device wherein as an integral part of the handle there is a bellows structure which can be utilized to decrease the volume of the container.

FIG. 14 shows an embodiment of the present dosing and dispensing device which operates on the same principle as the dosing and dispensing device of FIG. 9. However here, rather than the volume of the container 20 being decreased by pressing inwardly on all or portion of the sidewall 23 of container 20, there is provided a trigger bellows 39 which can be utilized to decrease the volume of container 20. In this embodiment, trigger bellows 39 as shown in FIG. 14 will contain a portion of the liquid 21 of container 20.

Figure 15:
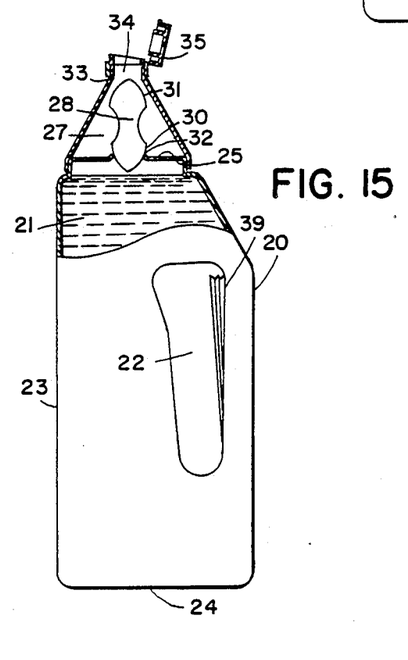
FIGS. 15, 16, 17, and 18 illustrate the operation of the dosing and dispensing device of FIG. 15.
Figures 16, 17:
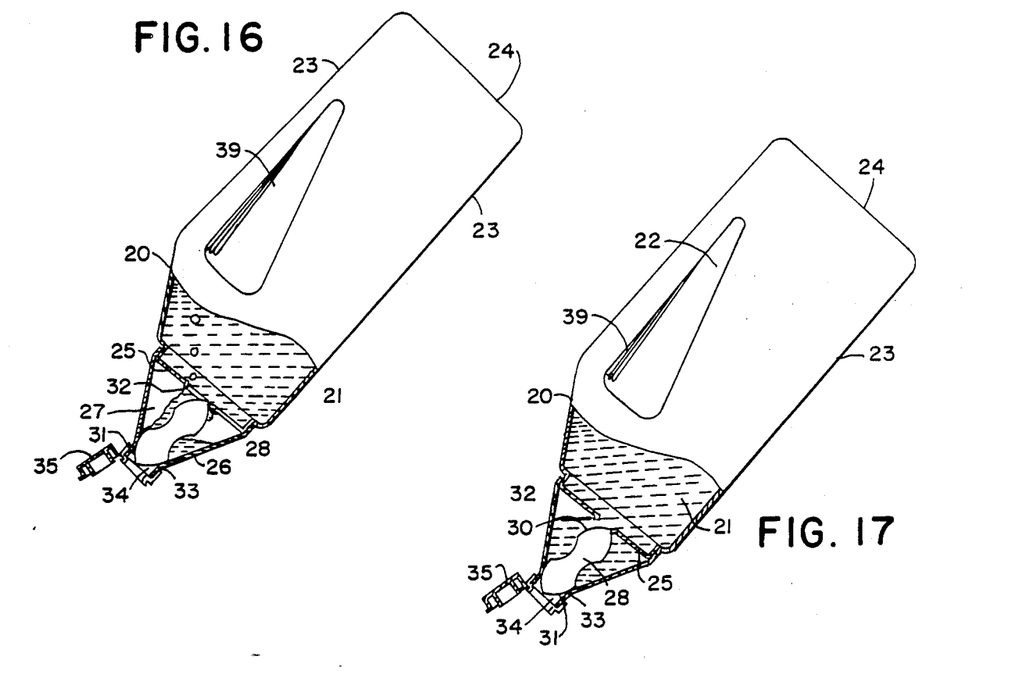
Figure 18:
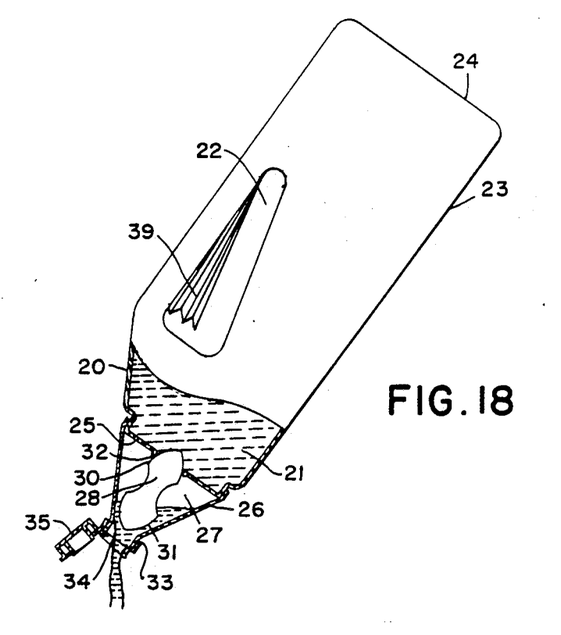

FIGS. 15-18 illustrate the operation of the dosing and dispensing device of FIG. 14. In FIG. 15, the trigger bellows 39 is shown in a compressed condition. As a result of actuating trigger bellows 39 the volume of container 20 has been decreased with a resulting increase in the liquid level within the container. In FIG. 16, it is shown that the container is now tilted while the trigger bellows 39 is maintained in a compressed actuated condition. As a result of being tilted, the self aligning valve 28 moves downwardly into dispensing aperture 34 thereby closing this dispensing aperture. Simultaneously, the container-measuring chamber aperture 32 is opened whereby liquid 21 from container 20 flows into measuring chamber 27. As is shown in FIG. 17, the trigger bellows 39 is maintained in a compressed state until the measuring chamber 27 has been substantially filled with liquid 21. At this point, the trigger bellows 39 is released. Upon release, a decreased pressure is formed in the container. As is shown in FIG. 18, the self-aligning valve 28 is drawn upwardly against gravity into container-measuring chamber aperture 32 to thereby close off this aperture. The self-aligning valve has been drawn into this position by the decrease pressure with container 20. In this orientation the measured dose of liquid is permitted to exit through dispensing aperture 34. At this point, after the liquid in the measuring chamber has been fully dispensed the trigger bellows can be actuated to initiate a further cycle for dispensing liquid 21, or the container can be put in the upright position and the closure cap secured dispensing aperture 34.

Regardless of the embodiment which would be utilized, the principle that is being used is that of inducing a reduced pressure within the container to draw the self-aligning valve 28 upwardly into the container-measuring chamber aperture in order to close off this aperture and to thereby dispense the liquid that has been flowed into the measuring chamber. In this way, a definite and given dose of liquid can be dispensed from the container. In any of the embodiments, the liquid can be dispensed in measured doses and until the container has been emptied.

The container and the measuring chamber can be constructed out of a variety of materials. The same is the case for the self aligning valve and the cap closure. It is preferred to use a polyene such as polyethylene, polyproylene, polybutylene, polybutadiene, or polyisobutylene, a polyester such as polyethylene terephthalate or polyisobutylene terephthalate, polyvinylchoride, polylinylidiene chloride, polyvinylacetate, polyvinyl alcohol, copolymers of polyenes and polyvinyl alcohol, polyvinylacetate and alike. There is realistically no particular limitation with regard to the materials that can be utilized in the construction of the components of the present dosing and dispensing device. Essentially the only limitation is that the materials used to construct the dosing and dispensing device must be inert with regard to the liquid that is to be contained within the container and which is to be dispensed through the measuring chamber.

It is also the case that the container can be of varying sizes. The size of the container can range from 50 milliliters to 5,000 milliliters or more. The liquids that will be contained and dispensed from the present dosing and dispensing device can be those with a viscosity similar to that of water up through viscosities of liquid soaps, liquid detergents, liquid softening agents and the like. Ideally, these dosing and dispensing devices will be used for glass cleaning compositions, various hard surface cleaning compositions, liquid bleaches, liquid detergents, liquid soaps, and liquid fabric softening substances. However, these dosing and dispensing devices can be utilized to dispense other liquids such as alcoholic beverages, noncarbonated beverages, and other liquid food substances.

We claim:

1. A self-dosing container comprising a lower container portion and a separate upper measuring chamber portion, an intermediate opening between said container and said measuring chamber and a dispensing opening in the upper part of said measuring chamber, a self-aligning valve alternately disposed in said intermediate opening and said dispensing opening whereby when said container and measuring chamber are maintained in a first orientation said valve can substantially seal said intermediate opening and when maintained in a second orientation can substantially seal said dispensing opening; and means to create a negative pressure in said container when said container and measuring chamber are oriented for the discharge of a substance from the measuring chamber whereby said self-aligning valve moves upwardly and seals said intermediate dispensing opening and simultaneously opens said dispensing opening.

2. A self-dosing container as in claim 1 wherein said negative pressure creating means comprises a groove in the part of said self-aligning valve which extends into said dispensing opening whereby when said container and measuring chamber are tilted, some contained substance can flow through said groove and said dispensing opening to thereby produce a negative pressure in said container.

3. A self-dosing container as in claim 1 wherein there is a closure over said dispensing opening.

4. A self-dosing container as in claim 1 wherein said container has a handle as an integral part thereof.

5. A self-dosing container as in claim 1 said negative pressure creating means comprises a portion of the sidewall of said measuring chamber in the form of a bellows whereby when said container and measuring chamber are tilted said bellows is extended by the weight of the substance in said measuring chamber with a negative pressure being produced in said container whereby said self-aligning valve moves upwardly and seals said intermediate opening and opens said dispensing opening.

6. A self-dosing container as in claim 5 wherein where is a closure over said dispensing opening.

7. A self-dosing container as in claim 5 wherein said container has a handle as an integral part thereof.

8. A self-dosing container as in claim 1 wherein said negative pressure creating means comprises means on said container to decrease the volume thereof whereby when said means to decrease the volume of the container is activated with the self-aligning valve substantially sealing said intermediate opening, and said container and measuring chamber tilted so that said self-aligning valve moves to open said intermediate opening and to substantially close said dispensing opening permitting substance from said containers to flow into said measuring chamber, and said means to decrease the volume of said container then released, a negative pressure is produced in said container whereby said self-aligning valve moves upwardly and seals said intermediate opening and opens said dispensing opening.

9. A self-dosing container as in claim 8 wherein said means to decrease the volume of said container consists of at least one part of one wall which can be squeezed to reduce the volume of said container.

10. A self-dosing container as in claim 9 wherein there is a closure over said dispensing opening.

11. A self-dosing container as in claim 8 wherein said container wall has a bellows as a part thereof which when compressed reduces the volume of said container.

12. A self-dosing container as in claim 11 wherein there is a closure over said dispensing opening.

13. A self-dosing container as in claim 11 wherein said container has a handle as an integral part thereof.

14. A self-dosing container as in claim 13 wherein said bellows is a part of said handle.

15. A method for providing a measured dose of a substance from a container comprising a container with a lower container portion and an upper measuring chamber portion, an intermediate opening between said container and said measuring chamber, a dispensing opening in the upper part of said measuring chamber, and a self-aligning valve alternately disposed within said intermediate opening and said dispensing opening, tilting said container so that said self-aligning valve moves from substantially sealing said intermediate opening to substantially sealing said dispensing opening, creating a decreased pressure in said container to cause said self-aligning valve to move from substantially sealing said dispensing opening to substantially sealing said intermediate opening and dispensing a measured dose of substance.

16. A method for providing a measured dose of a substance as in claim 15 wherein said decreased pressure in said container is created by removing a portion of said substance from the measuring chamber while said measuring chamber is being filled with substance.

17. A method for producing a measured dose of a substance as in claim 15 wherein said decreased pressure in said container is produced by increasing the volume of said measuring chamber as said measuring chamber is being filled with substance.

18. A method for producing a measured dose of a substance as in claim 15 wherein said decreased pressure in said container is produced by decreasing the volume of said container prior to tilting said container to flow said substance from said container to said measuring chamber, tilting said container and measuring chamber to flow substance from said container to said measuring chamber, and permitting said container to regain its original volume.

19. A method for providing a measured dose of a substance as in claim 18 wherein a second dose is provided by again decreasing the volume of said container while maintaining the container in a tilted orientation, filling the measuring chamber with said substance, permitting said container to regain its volume, and delivering a dose of said substance.

20. A method for providing a measured dose of a substance as in claim 15 wherein after dispensing a dose of said substance said container is sealed.

* * * * *